(12) United States Patent
Ogino

(10) Patent No.: US 12,106,475 B2
(45) Date of Patent: Oct. 1, 2024

(54) ELECTROPHORETIC ANALYSIS DATA PROCESSING DEVICE AND RECORD MEDIUM RECORDING ELECTROPHORETIC ANALYSIS DATA PROCESSING PROGRAM

(71) Applicant: SHIMADZU CORPORATION, Kyoto (JP)

(72) Inventor: Kota Ogino, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 460 days.

(21) Appl. No.: 17/540,730

(22) Filed: Dec. 2, 2021

(65) Prior Publication Data

US 2022/0187241 A1    Jun. 16, 2022

(30) Foreign Application Priority Data

Dec. 15, 2020    (JP) .................................. 2020-207437

(51) Int. Cl.
     *G06T 7/00*      (2017.01)
     *G01N 27/447*      (2006.01)

(52) U.S. Cl.
     CPC ..... *G06T 7/0012* (2013.01); *G01N 27/44717* (2013.01); *G01N 27/44756* (2013.01)

(58) Field of Classification Search
     CPC ............ G06T 7/0012; G01N 27/44717; G01N 27/44756; G01N 27/44704; G06K 9/00496
     See application file for complete search history.

(56) References Cited

U.S. PATENT DOCUMENTS

| | | | |
|---|---|---|---|
| 2017/0153202 A1* | 6/2017 | Dolnik | ............. G01N 27/44773 |
| 2020/0043162 A1* | 2/2020 | Kumagai | ......... G01N 27/44756 |
| 2020/0080965 A1* | 3/2020 | Chinomi | ................. C12Q 1/68 |

FOREIGN PATENT DOCUMENTS

| | | | |
|---|---|---|---|
| CN | 110794025 A | | 2/2020 |
| JP | 2008101960 A | * | 5/2008 |
| JP | 2020-020725 A | | 2/2020 |

OTHER PUBLICATIONS

Nov. 28, 2023, Japanese Office Action issued for related JP Application No. 2020-207437.

(Continued)

*Primary Examiner* — John J Lee
(74) *Attorney, Agent, or Firm* — Paratus Law Group, PLLC

(57) ABSTRACT

In order to improve the operability of the device and reduce incorrect operations, a device for processing data acquired by an electrophoretic analysis according to the present invention includes: a display processor (31, 33) configured to create an electropherogram based on acquired data and display the electropherogram on a screen of a display section (5); an analysis range specifier (4, 34) configured to receive, on the electropherogram displayed on the display section, a specification, by a user, of a smear range to be extracted as an analysis target, and display a background area corresponding to the specified smear range on the electropherogram, in a visual mode that makes the background area distinguishable from other background areas; and an analysis processor (35) configured to perform a predetermined smear analysis using data included in the specified smear area.

10 Claims, 6 Drawing Sheets

(56) References Cited

OTHER PUBLICATIONS

Simple Version 2100 Expert Software Ver. 02.08 User's Guide Electrophoresis, retrieved from https://web.archive.org/web/20170627230054/https://www.chemagilent.com/page_data/1004595/pdf/2100-ManualIntegration_ExpertSW.pdf, Jun. 28, 2017, pp. 1-41, Agilent Technologies.
Apr. 17, 2023, Chinese Office Action issued for related CN Application No. 202111409904.6.
Next Generation Sequencer (NGS) Library Application to Quality Control (QC), Application News No. B52, retrieved from the Internet on Aug. 18, 2020, URL:https://solutions.shimadzu.co.jp/cgi/ac?cmd=1&url=/solnavi/s/apl/a-news/1/b/pdf/b052.pdf, Shimadzu Corporation.
MultiNA—Microchip electrophoresis device for DNA/RNA analysis, retrieved from the Internet on Aug. 18, 2020, URL:https://www.an.shimadzu.co.jp/bio/mce/multina/spec.htm, Shimadzu Corporation.
Suzuki, Koichi et al., MCE-202 "MultiNA": Microchip Electrophoresis System for DNA/RNA Analysis—Development and Application—, Apr. 24, 2008, pp. 117-122, vol. 64. Nos. 3-4, Shimadzu Hyouron (Shimadzu Review).

* cited by examiner

Fig. 6

| | BEGIN SIZE (bp) | END SIZE (bp) | AVR. SIZE (bp) | AREA |
|---|---|---|---|---|
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |

ELECTROPHORETIC ANALYSIS DATA PROCESSING DEVICE AND RECORD MEDIUM RECORDING ELECTROPHORETIC ANALYSIS DATA PROCESSING PROGRAM

CROSS REFERENCE TO PRIOR APPLICATION

This application claims priority to Japanese Patent Application No. 2020-207437 (filed on Dec. 15, 2020), which is hereby incorporated by reference in its entirety.

TECHNICAL FIELD

The present invention relates to a data processing device for processing data acquired with an electrophoresis system as well as a non-transitory record medium recording a computer program for processing the aforementioned type of data.

BACKGROUND ART

In recent years, next generation sequencers that can analyze the entire genome information of DNA fragments at high speeds have been demonstrating their power in various areas, including drug discovery, medical treatment, agriculture and livestock as well as biochemistry. In an analysis using a normal type of next generation sequencer, DNA is extracted from a living tissue and fragmented into pieces having an appropriately narrow size distribution to prepare a library (which is hereinafter called the "NGS library"). This NGS library is analyzed by the next generation sequencer to determine the base sequence of the original DNA.

In this analysis, if the size distribution of the NGS library is inappropriate, the sequencing cannot produce a satisfactory result, and the entire analysis work will be useless. To avoid this situation, a task called the "QC (quality control)", which is aimed at checking the size distribution and concentration of the prepared NGS library, has conventionally been performed before the sequencing.

Non Patent Literature 1 discloses the use of a microchip electrophoresis system described in Non Patent Literature 2 and 3 for checking the size distribution and concentration of an NGS library. As disclosed in Non Patent Literature 2 and 3 or other related document, the microchip electrophoresis system can automatically perform a microchip electrophoretic analysis for a large number of samples prepared beforehand. The system also includes data processing software, with which the data acquired by the electrophoretic analysis can be analyzed.

In an electrophoresis waveform obtained by an electrophoretic analysis of an NGS library, a peak having a broad shape which reflects the size distribution of the DNA fragments will be observed (for example, see FIG. 3 in Non Patent Literature 1). This broad peak in an electrophoresis waveform is generally called a smear or a smear peak. The aforementioned data processing software includes a piece of software for smear analysis, which calculates the average size and concentration of a smear within a specified range.

CITATION LIST

Non Patent Literature

Non Patent Literature 1: "Jisedai Shiikensaa (NGS) Raiburarii Quality Control (QC) Heno Ouyou (Application to Quality Control of Next Generation Sequencer)", *Application News No. B*52, Shimadzu Corporation, [online], [accessed on Aug. 18, 2020], the Internet Non Patent Literature 2: "MultiNA—DNA/RNA Bunseki You Maikurochippu Denki Eidon Souchi (MultiNA—Microchip Electrophoresis System for DNA/RNA Analysis)", Shimadzu Corporation, [online], [accessed on Aug. 18, 2020], the Internet Non Patent Literature 3: Koichi Suzuki and 12 other authors, "DNA/RNA Bunseki You Maikurochippu Denki Eidou Souchi IME-202 MultiNA—Kaihatsu To Ouyou—(MCE-202 MultiNA: microchip electrophoresis system for DNA/RNA analysis: development and application)", issued by Shimadzu Hyouron Henshubu, Apr. 24, 2008, *Shimadzu Hyouron (Shimadzu Review)*, Vol. 64. Nos. 3-4, pp. 117-122

SUMMARY OF INVENTION

Technical Problem

To perform a smear analysis using the previously described type of software for data acquired by an electrophoretic analysis, an operator initially needs to specify the peak-beginning size, peak-ending size and other parameters in order to specify the range of the smear to be analyzed. A conventional software product for smear analysis uses user-interface (UI) controls that can receive numerical input, such as a data grid or textbox, to allow an operator to specify the values of those parameters.

Therefore, while visually examining the shape of the electrophoresis waveform on an electropherogram, the operator needs to determine the beginning and ending positions of the smear which should be analyzed, read the sizes at the respective positions on the electropherogram, and numerically input those sizes into the data grid or other UI controls. However, such a task is complex and inefficient. In particular, a cumbersome operation is required when an inputted numerical value must be corrected. Additionally, an error in the analysis result easily occurs due to an incorrect operation, such an incorrect reading or input of a numerical value. Furthermore, another problem may occur in the case of a peak having a shape that requires specifying a plurality of smear ranges which differ from each other, for each of which the average size and other related values need to be calculated. In such a case, it is often difficult for an operator specifying the smear ranges to determine, for example, whether or not a plurality of smear ranges already specified overlap each other, or to what extent they overlap each other if there are indeed smear ranges overlapping each other.

The present invention has been developed to solve the previously described problems. Its primary objective is to provide an electrophoretic analysis data processing device and a record medium recording an electrophoretic analysis data processing program which can improve the operability of the device in a smear analysis and enhance the working efficiency of the analysis as well as decrease incorrect operations.

Solution to Problem

One mode of the electrophoretic analysis data processing device according to the present invention developed for solving the previously described problems is a data processing device for processing data acquired by an electrophoretic analysis, including:

a display processor configured to create an electropherogram based on the acquired data and display the electropherogram on a screen of a display section;

an analysis range specifier configured to receive, on the electropherogram displayed on the display section, a specification, by a user, of a smear range to be extracted as an analysis target, and display a background area corresponding to the specified smear range on the electropherogram, in a visual mode that makes the background area distinguishable from other background areas; and an analysis processor configured to perform a predetermined smear analysis using data included in the specified smear area.

One mode of the record medium recording an electrophoretic analysis data processing program according to the present invention developed for solving the previously described problems is a non-transitory record medium recording a data processing program for processing data acquired by an electrophoretic analysis, where the program is configured to make a computer perform:

a display process step for creating an electropherogram based on the acquired data and displaying the electropherogram on a screen of a display section;

an analysis range specification step for receiving, on the electropherogram displayed on the display section, a specification, by a user, of a smear range to be extracted as an analysis target, and displaying a background area corresponding to the specified smear range on the electropherogram, in a visual mode that makes the background area distinguishable from other background areas; and an analysis process step for performing a predetermined smear analysis using data included in the specified smear area.

Advantageous Effects of Invention

The electrophoretic analysis data processing device and the record medium recording an electrophoretic analysis data processing program according to the present invention are particularly useful for an analysis of a library prepared for a sequence analysis of DNA or RNA. In that case, the "predetermined smear analysis" may be an analysis for calculating at least one of the values related to the library, such as the average size, size distribution, concentration, molar concentration and area.

The previously described modes of the electrophoretic analysis data processing device and the record medium recording an electrophoretic analysis data processing program according to the present invention allow the user to intuitively specify a smear range as an analysis target on a graph of the electropherogram while visually examining the shape and other features of the peak waveform in the displayed electropherogram. The specification of the smear range can be achieved by a graphical operation, e.g., by moving each of the lines indicating the beginning and ending positions of the smear range or by moving the entire range. Thus, the smear range to be analyzed can be conveniently and exactly specified. The user can intuitively locate the specified smear range on the electropherogram and easily recognize the appearance of the electrophoresis waveform included in the smear range as well as the positional relationship (e.g., extent of overlapping) of a plurality of smear ranges when two or more smear ranges are specified.

Thus, the previously described modes of the electrophoretic analysis data processing device and the record medium recording an electrophoretic analysis data processing program according to the present invention can improve the operability of the device for the user in performing a smear analysis and enhance the working efficiency of the analysis as well as decrease incorrect operations.

BRIEF DESCRIPTION OF DRAWINGS

FIG. 6 is an example of an analysis result table in the smear analysis window.

DESCRIPTION OF EMBODIMENTS

One embodiment of an electrophoretic analysis system using an electrophoretic analysis data processing device and a record medium recording an electrophoretic analysis data processing program according to the present invention is hereinafter described with reference to the attached drawings.

Figure 1:
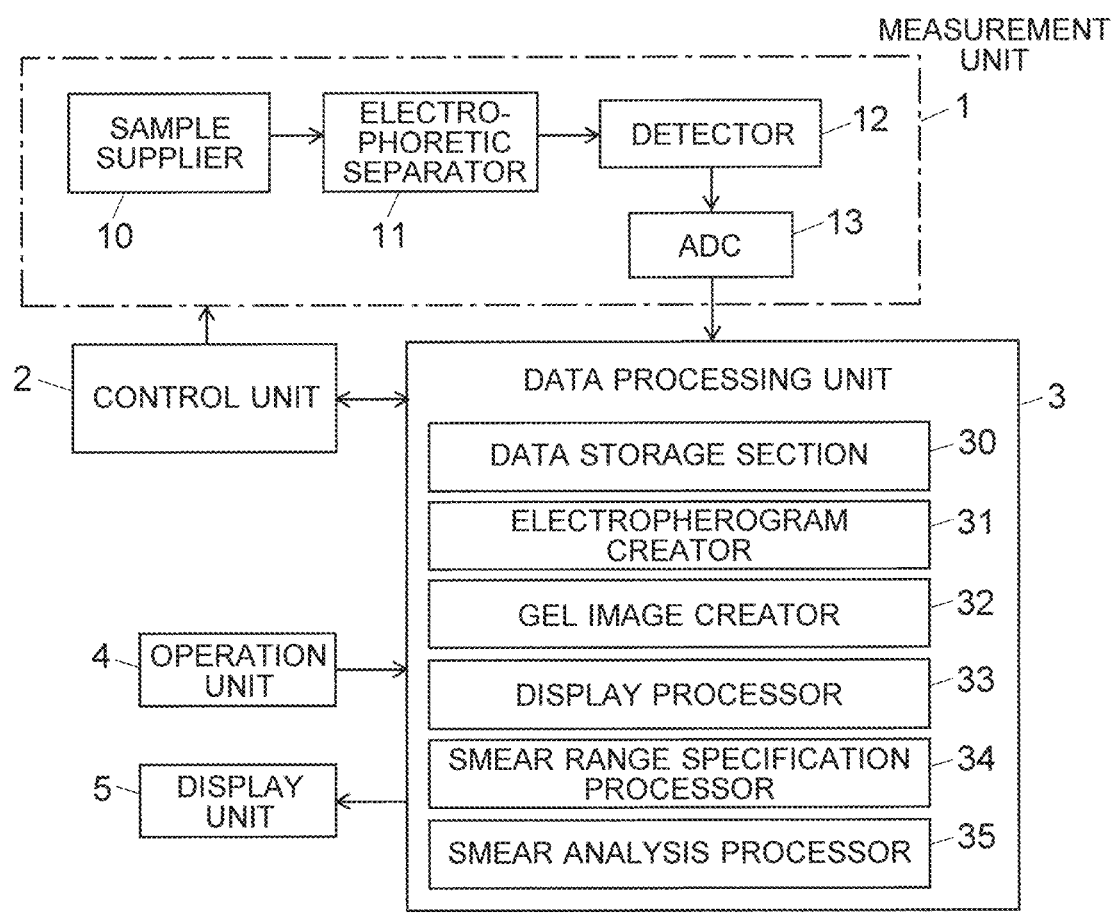
FIG. 1 is a schematic configuration diagram of an electrophoretic analysis system according to one embodiment of the present invention.

FIG. 1 is a schematic configuration diagram of the electrophoretic analysis system according to the present embodiment.

As shown in FIG. 1, the present system includes a measurement unit 1, control unit 2, data processing unit 3, operation unit 4 and display unit 5.

The measurement unit 1 is configured to perform a measurement (electrophoretic analysis) on a sample and acquire data. This unit includes a sample supplier 10, electrophoretic separator 11, detector 2, analogue-to-digital converter (ADC) 13 and other components.

The data processing unit 3 is configured to process data acquired with the measurement unit 1. This unit includes a data storage section 30, electropherogram creator 31, gel image creator 32, display processor 33, smear range specification processor 34, smear analysis processor 35 and other components as its functional blocks.

As the measurement unit 1, for example, the main unit of the microchip electrophoresis system MCE-202 (manufactured by Shimadzu Corporation) disclosed in Non Patent Literature 2 can be used. The control unit 2 and data processing unit 3 are actually a multipurpose personal computer (PC), on which the functions of the previously mentioned functional blocks are exhibited by running, on the PC, dedicated controlling-and-processing software installed on the same PC. A portion of this controlling-and-processing software corresponds to the data processing program recorded in the non-transitory record medium according to the present invention.

A smear analysis of an NGS library using the present electrophoretic analysis system is performed as follows: A well plate containing samples to be analyzed, and predetermined reagents (including a buffer solution), are set in the sample supplier 10. An operator (user) using the operation unit 4 sets the analysis schedule and issues a command to initiate the measurement. Then, the control unit 2 operates the electrophoretic separator 11 and other related sections so as to perform an analysis according to the determined program.

More specifically, the channels in an electrophoretic chip in the electrophoretic separator 11 are initially filled with the buffer solution. A sample contained in a predetermined well on the well plate (e.g., a 96-well plate) set in the sample supplier 10 is subsequently injected into the channels at a predetermined position in the chip (more exactly, into an intersecting portion of the sample introduction channel and the separation channel). Subsequently, the electrophoretic separator 11 applies electrophoretic voltages to the reservoirs in the chip to make the sample migrate along the separation channel, whereby the components (in the present example, DNA fragments) in the sample are separated along the separation channel. The detector 12, which is a fluorescence detector, sequentially detects the components separated from each other due to the migration. The detection signals produced by the detector 12 are digitized by the analogue-to-digital converter 13 and sent to the data processing unit 3, to be saved in the data storage section 30.

When the measurement needs to be performed for a plurality of samples, the measurement is similarly repeated for the other samples prepared on the well plate. It should be noted that the microchip electrophoresis system MCE-202 mentioned earlier can perform measurements for four samples in parallel.

When one or more sets of data collected by the measurement performed for one or more samples are stored in the data storage section 30, a smear analysis is performed in the data processing unit 3. An example of the procedure of the smear analysis is hereinafter described.

Figure 2:
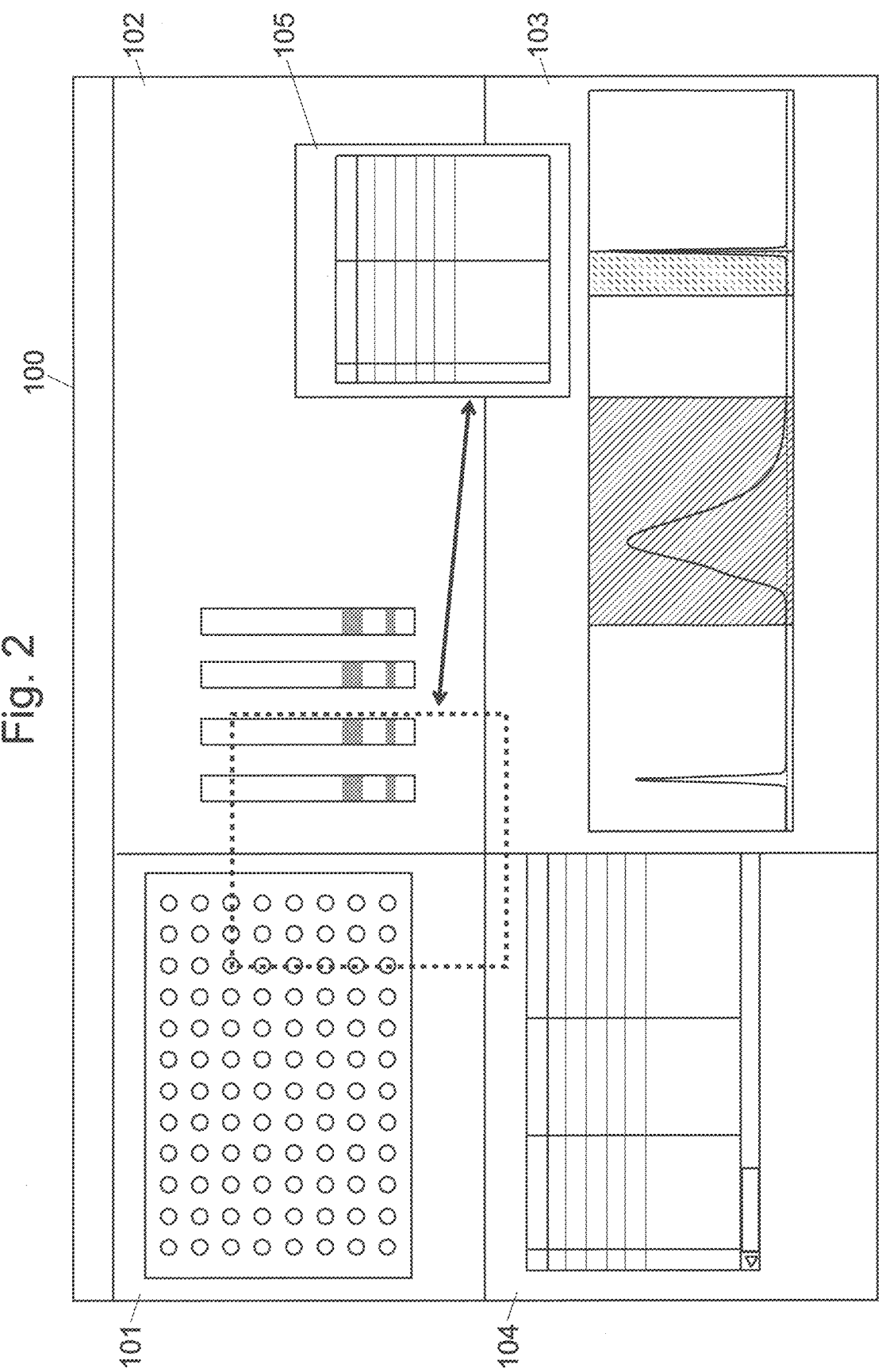
FIG. 2 is a schematic diagram showing one example of a smear analysis window in the electrophoretic analysis system according to the present embodiment.

When a predetermined operation has been performed by the operator using the operation unit 4, the display processor 33 displays a smear analysis window 100 as shown in FIG. 2 on the screen of the display unit 5. The smear analysis window 100 is roughly divided into four areas: a sample display area 101, gel image display area 102, electropherogram display area 103 and analysis result display area 104. It should be noted that FIG. 2 shows a situation after the completion of a smear analysis or a situation with the result of a past smear analysis displayed. When no smear analysis processing has yet been performed, nothing is displayed in the gel image display area 102 and the electropherogram display area 103, while the analysis result display area 104 shows an analysis result table in which the analysis-result fields are blank. Additionally, a size input dialog box 105 (which will be described later) is normally hidden when the smear analysis window 100 is newly displayed.

In the sample display area 101 in the smear analysis window 100, an image simulating a well plate is displayed, on which the operator can specify a target sample for the smear analysis by a clicking operation using the operation unit 4. After specifying one sample, the operator issues a command to initiate the analysis, whereupon the electropherogram creator 31 reads a data file corresponding to the specified sample from the data storage section 30 and creates an electropherogram on which an electrophoresis waveform based on the data is drawn. The gel image creator 32 creates a gel image based on the created electropherogram.

The horizontal axis of the electropherogram is "migration time", "travel time index" or "size", from which the operator can select a desired option. An "migration time" axis, which is one of the options, directly indicates the time values recorded when the measurement was performed in the measurement unit 1. A "travel time index" axis indicates migration times in a normalized form (in %) based on the migration times of a plurality of reference substances of known sizes added to the sample. A "size" axis shows substantial size values converted from migration times based on the known sizes of a plurality of reference substances.

The display processor 33 displays the created electropherogram and gel image in the electropherogram display area 103 and gel image display area 102 of the smear analysis window 100. The diagram in FIG. 2 shows a situation in which an electropherogram and gel image are displayed.

Figure 3:
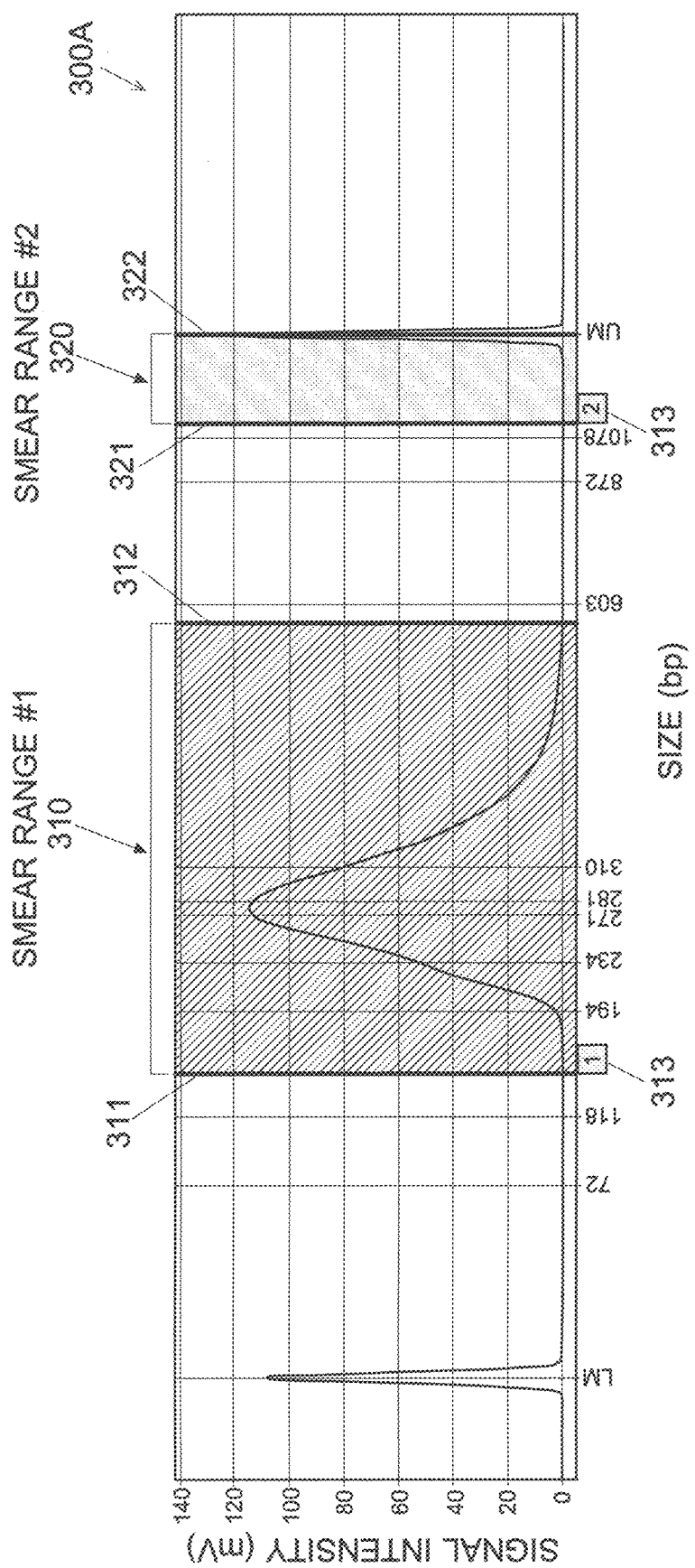
FIG. 3 is an example of the electropherogram in the smear analysis window (in the case where there is a single electrophoresis waveform).

FIG. 3 shows one example of the electropherogram 300A. This example shows one electrophoresis waveform acquired for one sample. The horizontal axis represents size. In FIG. 3, the peak observed at a position (size) with size LM is a peak corresponding to a substance having a travel time index of 0%, while the peak observed at a position with size UM is a peak corresponding to a substance having a travel time index of 100%. The numerical values shown within the range from LM to UM and the vertical lines located at those numerical values are the known sizes of a plurality of reference substances and the lines determined by measurements of those substances. Since an NGS library contains a large number of DNA fragments whose sizes show a distribution with a certain breadth, a broad peak, i.e., smear, is normally observed in an electrophoresis waveform. In the example of FIG. 3, one smear with slightly long tailing is observed. It should be noted that the two smear ranges 310 and 320 shown in FIG. 3 are not displayed when this electropherogram is created for the first time.

Figure 5:
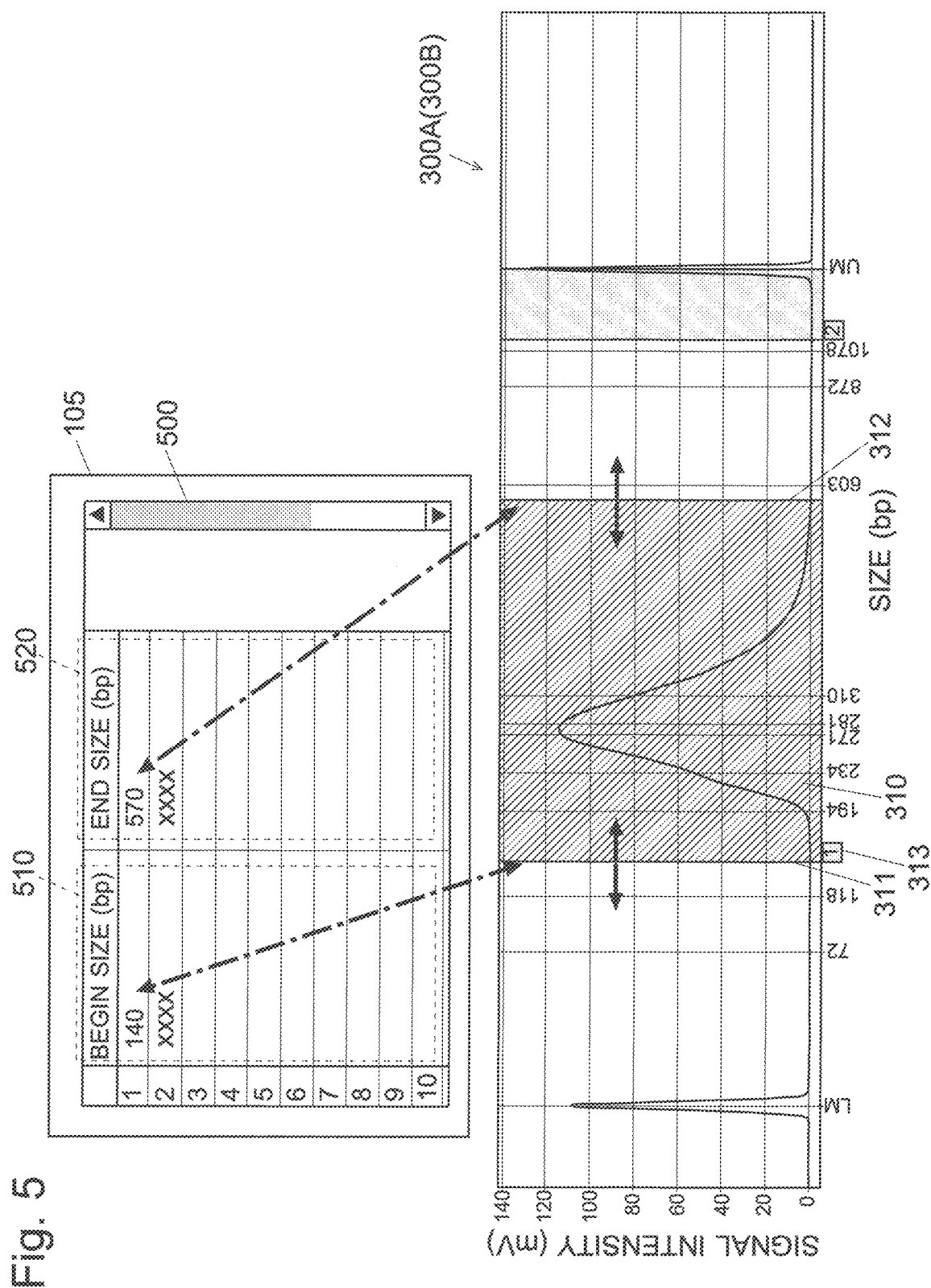
FIG. 5 is diagram showing a smear analysis window with a size input dialog box displayed as a pop-up on the window.

For a smear analysis, the beginning size and ending size of a smear must be specified. When a predetermined operation is performed on the smear analysis window 100 by the operator, a size input dialog box 105 including a size specification data grid 500 as shown in FIGS. 2 and 5 is displayed as a pop-up on the smear analysis window 100. The size input dialog box 105 can be moved to a desired position on the smear analysis window 100 by a drag-and-drop operation.

One row in the size specification data grid 500 corresponds to one smear range. The operator can specify a smear range to be analyzed by inputting desired numerical values in the beginning size input field 510 and the ending size input field 520. However, it is cumbersome for the operator to find an appropriate beginning position from the shape of the electrophoresis waveform on the electropherogram 300A, visually read the size corresponding to the beginning position, and input the numerical value of that size into the beginning size input field 510.

One method to deal with this problem in the present system is as follows: The operator initially inputs appropriate numerical values into the beginning size input field 510 and ending size input field 520. These numerical values may be any size values on the electropherogram. The smear range specification processor 34 displays, on the electropherogram 300A, vertical lines corresponding to the numerical values inputted in the size specification data grid 500. That is to say, as shown in FIG. 5, a beginning position indication line 311 corresponding to the numerical value in the beginning size input field 510 and an ending position indication line 312 corresponding to the numerical value in the ending size input field 520 are displayed. Furthermore, the area sandwiched between the beginning position indication line 311 and the ending position indication line 312 is displayed as a smear range 310 with a predetermined background color different from the other areas. This allows the operator to intuitively recognize the positional relationship between the smear range specified for the moment and the smear in the electrophoresis waveform.

Immediately after arbitrary numerical values have been inputted into the beginning size input field 510 and the ending size input field 520 by the operator in the previously described manner, the smear range 310 displayed on the electropherogram 300A normally does not satisfactorily cover the smear in the electrophoresis waveform. Accordingly, the smear range specification processor 34 allows the operator to adjust the smear range 310 as desired by the following operation via the operation unit 4. The operator moves each of the beginning and ending position indication lines 311 and 312 to a desired position by selecting one of the lines 311 and 312 on the electropherogram 300A by a clicking or similar operation and moving the selected line to the desired position by a drag-and-drop operation. In this manner, the operator can adjust the beginning position, ending position and width of the smear range 310 in a graphical way.

Under the beginning position indication line 311 at the left end of the smear range 310, a range indication tag 313 is shown indicating a number identifying each individual smear range (number "1" is assigned to the smear range 310 in FIG. 3). Clicking this range indication tag 313 activates the smear range linked with the range indication tag 313. In this state, a drag-and-drop operation for horizontally moving the range indication tag 313 can be performed to change the horizontal position of the active smear range, with its width maintained. In this manner, the operator can change the position of the smear range while maintaining the width of the smear range.

The position and width of a smear range can be freely adjusted by the two previously described methods, i.e., by moving one or both of the beginning and ending position indication lines 311 and 312 by a drag-and-drop operation or by moving the range indication tag 313 by a drag-and-drop operation. During those operations for the adjustment, the smear range specification processor 34 updates the numerical values in the beginning and ending size input fields 510 and 520 in the corresponding row of the size specification data grid 500 according to the movement of the beginning position indication line 311 and/or the ending position indication line 312. In other words, the numerical values in the beginning and ending size input fields 510 and 520 in one row of the size specification data grid 500 are interlocked with the positions of the beginning and ending position indication lines 311 and 312 of one smear range 310 on the electropherogram 300A. A change in one of these two areas is immediately reflected in the other area. Thus, the smear range can be conveniently and intuitively adjusted by graphical operations on the electropherogram 300A.

In FIG. 3, another smear range 320 is shown apart from the smear range 310. A plurality of smear ranges can be set in this manner. Different smear ranges are displayed with different background colors on the electropherogram 300A. Each smear range corresponds to a different row in the size specification data grid 500. Different smear ranges on the electropherogram 300A are independent of each other and allow their respective positions and widths to be individually adjusted by the previously described operations for each smear range.

Figure 4:
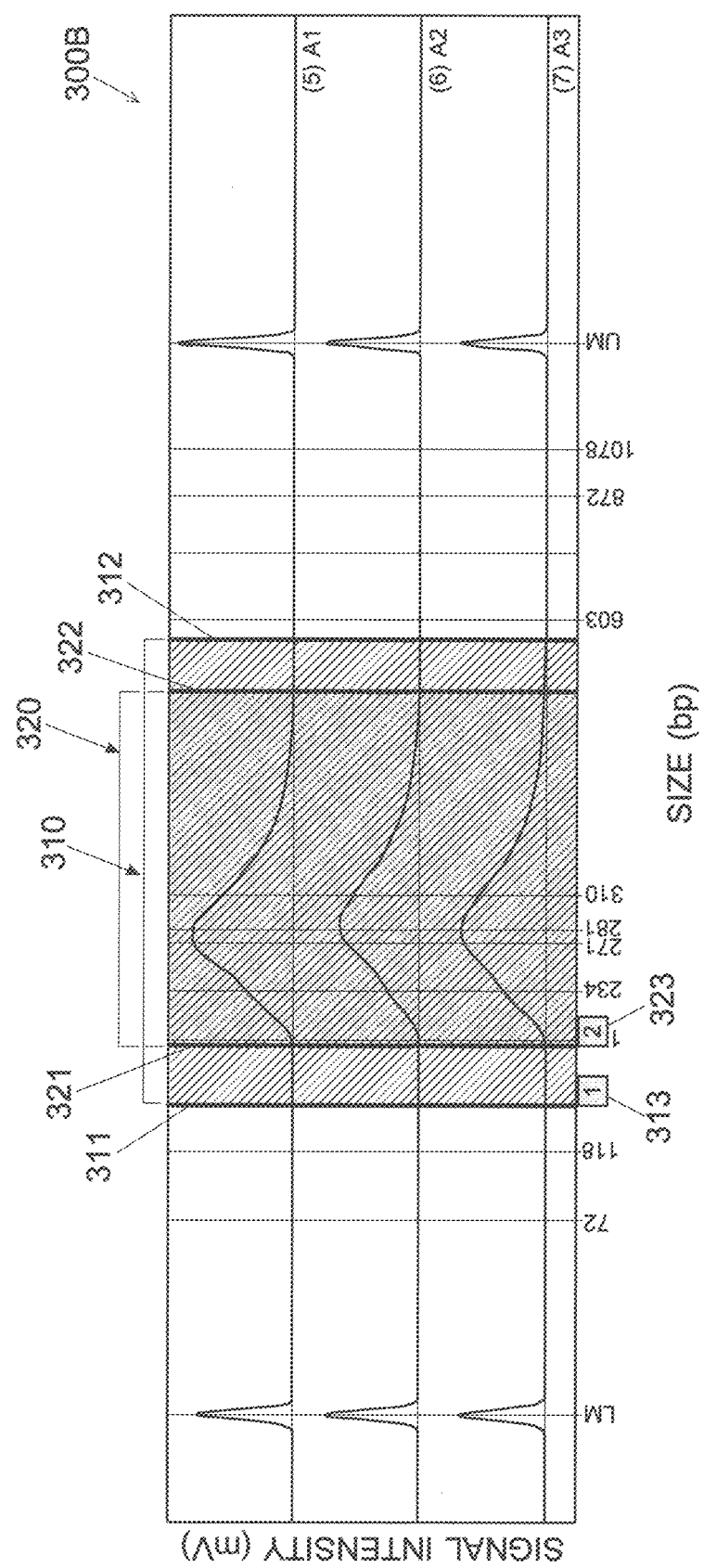
FIG. 4 is another example of the electropherogram in the smear analysis window (in the case where there are a plurality of electrophoresis waveforms).

FIG. 4 shows an example in which an electropherogram 300B has been created from three electrophoresis waveforms based on three sets of data respectively acquired for three samples, by arranging those waveforms in a vertically stacked form with their horizontal axes aligned. Although the three electrophoresis waveforms in FIG. 4 are clearly separated from each other, those waveforms may be drawn in a superposed form with a slight shift in the vertical direction. As another possibility, a plurality of waveforms may be given different display colors (or different visual modes other than the color) and shown in a completely superposed form, sharing not only the horizontal axis but also the vertical axis. Even when multiple electrophoresis waveforms are displayed next to each other or in a superposed form, with at least their horizontal axes aligned, a plurality of smear ranges can be individually set at a desired position and with a desired width.

The positions of a smear (size distribution) in a plurality of electrophoresis waveforms respectively acquired for different samples do not always coincide with each other; they are often displaced. In that case, it will be convenient if a different smear range can be set for each of the smears displaced from each other. In the example of FIG. 4, in which the first smear range 310 overlaps the second smear range 320, these smear ranges 310 and 320 have different background colors assigned. The portion where the two smear ranges 310 and 320 overlap has a different display color resulting from the overlap of the two background colors, so it is easy for the operator to visually recognize each of the smear ranges 310 and 320 as well as the portion where the two smear ranges overlap. When the beginning position indication lines 311 and 321 of the smear ranges 310 and 320 overlap or are extremely close to each other, the range indication tags 313 and 323 will also overlap each other. In that case, the last-added smear range may be given priority and its range indication tag 313 or 323 may be displayed in the foreground.

The operator can increase the priority of a smear range corresponding to a row in the size specification data grid 500 by clicking an appropriate position on that row. When the priority of one row is increased on the size specification data grid 500, the numerical values in that row will be highlighted as compared to the numerical values in the other rows. The range indication tag 313 or 323 for the smear range corresponding to the highlighted row is also highlighted on the electropherogram 300A (300B). Accordingly, for example, the operator can easily recognize the smear range which is most noteworthy for the operator among the plurality of smear ranges 310 and 320 as well as the information indicating that smear range.

In the previously described manner, the electrophoretic analysis system according to the present embodiment allows the user to specify one or more smear ranges to be analyzed in a graphical way. After the smear range or ranges have been specified, the smear analysis processor 35 calculates the average size, size distribution, ratio to the total, concentration, molar concentration, area and other related values for each smear range as well as for each sample, based on the data of each sample included in the specified smear range. The display processor 33 immediately displays the average size and other analysis results calculated by the smear analysis processor 35 in the analysis result table 400 displayed in the analysis result display area 104. As noted earlier, the electropherogram may have the electrophoresis time or travel time index plotted on the horizontal axis in place of the size. Even in that case, the calculations for the smear analysis can be performed using size values converted from the plotted values.

Figure 6:
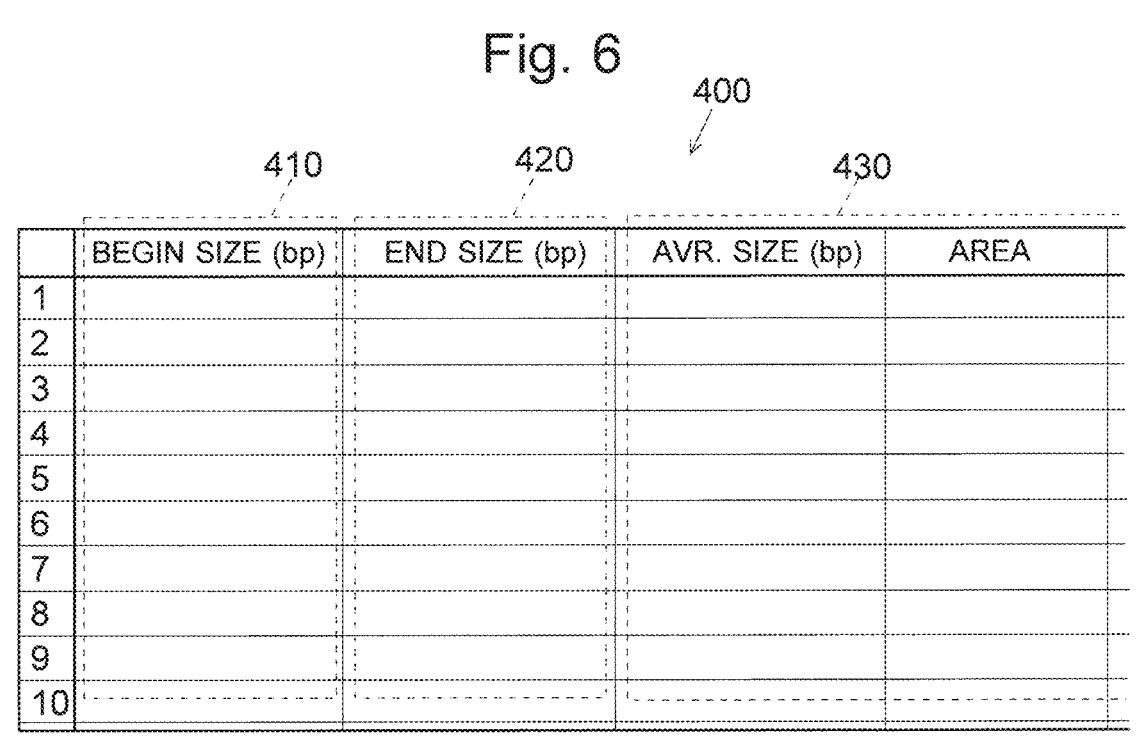

FIG. 6 shows one example of the analysis result table 400. The analysis result table 400 has a beginning size display field 410 and ending size display field 420 as well as analysis result display fields 430 for the average size and other items in each row. The beginning size display field 410 and ending size display field 420 show the same numeral values as the beginning size and ending size shown in the size specification data grid 500. The analysis result display fields 430 show the result of a calculation by the smear analysis processor 35.

When the position and/or width of a smear range is changed by user operations, the smear analysis processor 35 responds to that change and performs recalculations based on the data after the change, while the display processor 33 updates the display according to the recalculated result. For example, when an operation for moving a beginning position indication line on the electropherogram is performed, the operation is almost immediately followed by a change of the numerical values in the beginning size display field 410 as well as the analysis result display fields 430 of the analysis result table 400. Thus, while modifying the smear range on the electropherogram in a graphical way, the operator can immediately view the result of the smear analysis corresponding to the smear range which is being modified.

The smear analysis result has a considerable number of items. However, not all users will view all items; different users have different sets of items they want to view. Accordingly, a separate menu may be provided to allow the operator to previously select items to be displayed in the analysis result display fields 430 of the analysis result table 400, and the display processor 33 may be configured to display only the selected items.

It should be noted that the previous embodiment is a mere example of the present invention, and any change, modification, addition or the like appropriately made within the spirit of the present invention will naturally fall within the scope of claims of the present application.

For example, the arrangement of the display areas in the smear analysis window 100 is a mere example, and those areas may be appropriately transposed. The size input dialog box 105 may be fixedly displayed. An auxiliary display area may be hidden from view. The display areas may be appropriately resizable.

[Various Modes of Invention]

A person skilled in the art can understand that the previously described illustrative embodiment is a specific example of the following modes of the present invention.

(Clause 1) One mode of the electrophoretic analysis data processing device is a data processing device for processing data acquired by an electrophoretic analysis, including:

a display processor configured to create an electropherogram based on the acquired data and display the electropherogram on a screen of a display section;

an analysis range specifier configured to receive, on the electropherogram displayed on the display section, a specification, by a user, of a smear range to be extracted as an analysis target, and display a background area corresponding to the specified smear range on the electropherogram, in a visual mode that makes the background area distinguishable from other background areas; and an analysis processor configured to perform a predetermined smear analysis using data included in the specified smear area.

(Clause 7) One mode of the record medium recording an electrophoretic analysis data processing program according to the present invention is a non-transitory record medium recording a data processing program for processing data acquired by an electrophoretic analysis, where the program is configured to make a computer perform:

a display process step for creating an electropherogram based on the acquired data and displaying the electropherogram on a screen of a display section;

an analysis range specification step for receiving, on the electropherogram displayed on the display section, a specification, by a user, of a smear range to be extracted as an analysis target, and displaying a background area corresponding to the specified smear range on the electropherogram, in a visual mode that makes the background area distinguishable from other background areas; and an analysis process step for performing a predetermined smear analysis using data included in the specified smear area.

The device described in Clause 1 and the record medium recording the program described in Clause 7 allow the user to visually examine the waveform shape or other features of a peak in an electrophoresis waveform on an electropherogram and intuitively specify or modify a smear range to be analyzed on the screen. Therefore, the user can conveniently perform the specification of a smear range and other related tasks without making mistakes. In other words, the device and program can improve the operability of the device in a smear analysis and enhance the working efficiency of the analysis as well as decrease incorrect operations.

(Clause 2) In the electrophoretic analysis data processing device described in Clause 1, the display processor may be configured to create and display an electropherogram in which one or more electrophoresis waveforms are arranged so that at least the horizontal axes of the electrophoresis waveforms are aligned with each other, and the analysis range specifier may be configured to receive the specification of the smear range on the electropherogram in which the one or more electrophoresis waveforms are displayed.

(Clause 8) In the record medium recording an electrophoretic analysis data processing program described in Clause 7, the display process step may include creating and displaying an electropherogram in which one or more electrophoresis waveforms are arranged so that at least the horizontal axes of the electrophoresis waveforms are aligned with each other, and the analysis range specification step may include receiving the specification of the smear range on the electropherogram in which the one or more electrophoresis waveforms are displayed.

The device described in Clause 2 and the record medium recording the program described in Clause 8 allow the user to set an appropriate smear range while comparing a plurality of electrophoresis waveforms which respectively correspond to different samples. Additionally, by allowing a plurality of smear ranges to be set at different positions with different widths, a smear range can be individually set for each peak on each electrophoresis waveform.

(Clause 3) In the electrophoretic analysis data processing device described in Clause 1 or 2, the analysis range specifier may be configured to change the position and the width of the smear range on the electropherogram according to a drag operation performed to move the two end portions of the smear range individually.

(Clause 9) In the record medium recording an electrophoretic analysis data processing program described in Clause 7 or 8, the analysis range specification step may include changing the position and the width of the smear range on the electropherogram according to a drag operation performed to move the two end portions of the smear range individually.

The device described in Clause 3 and the record medium recording the program described in Clause 9 allow the user to intuitively change the position and the width of the smear range to be analyzed by a simple operation on the screen.

(Clause 4) In the electrophoretic analysis data processing device described in one of Clauses 1-3, the analysis range specifier may be configured to change the position of the smear range on the electropherogram while maintaining the width of the smear range, according to a drag operation performed to move a tag assigned to the smear range.

(Clause 10) In the record medium recording an electrophoretic analysis data processing program described in one of Clauses 7-9, the analysis range specification step may include changing the position of the smear range on the electropherogram while maintaining the width of the smear range, according to a drag operation performed to move a tag assigned to the smear range.

The device described in Clause 4 and the record medium recording the program described in Clause 10 allow the user to intuitively change the position of the smear range to be analyzed by a simple operation on the screen while maintaining the width of the smear range.

(Clause 5) In the electrophoretic analysis data processing device described in one of Clauses 1-4, the analysis range specifier may be configured to display, on the same screen as the electropherogram, an input area which allows numerical input of each of the beginning position and the ending position of the smear range to be analyzed, and to interlock an operation for an instruction concerning the smear range on the electropherogram and an operation for the numerical input in the input area with each other.

(Clause 11) In the record medium recording an electrophoretic analysis data processing program described in one of Clauses 7-10, the analysis range specification step may include displaying, on the same screen as the electropherogram, an input area which allows numerical input of each of the beginning position and the ending position of the smear range to be analyzed, and interlocking an operation for an instruction concerning the smear range on the electropherogram and an operation for the numerical input in the input area with each other.

In the device described in Clause 5 and the record medium recording the program described in Clause 11, when a smear range is specified by numerical input, the positional relationship between the smear range and the smear in the electrophoresis waveform can be immediately viewed on the electropherogram. Conversely, when a smear range is specified or modified on the electropherogram in a graphical way, the state of the specified or modified smear range can be immediately checked by numerical values. This reduces incorrect operations, such as incorrect inputs or manipulations, and the user can exactly specify the smear range and obtain the desired smear analysis result.

(Clause 6) In the electrophoretic analysis data processing device described in one of Clauses 1-5, the analysis processor may be configured to perform the smear analysis every time the smear range specified by the analysis range specifier is modified, and the display processor may be configured to display, on the same screen as the electropherogram, a smear analysis result obtained by the analysis processor.

(Clause 12) In the record medium recording an electrophoretic analysis data processing program described in one of Clauses 7-11, the analysis process step may include performing the smear analysis every time the smear range specified in the analysis range specification step is modified, and the display process step may include displaying, on the same screen as the electropherogram, a smear analysis result obtained in the analysis process step.

The device described in Clause 6 and the record medium recording the program described in Clause 12 allow the user to modify the smear range and immediately view a smear analysis result corresponding to the smear range being modified. Accordingly, for example, the user can quickly determine whether or not the size distribution of the NGS library is appropriate for the analyzing by a next generation sequencer.

REFERENCE SIGNS LIST

1 . . . Measurement Unit
10 . . . Sample Supplier
11 . . . Electrophoretic Separator
12 . . . Detector
13 . . . Analogue-to-Digital Convener
2 . . . Control Unit
3 . . . Data Processing Unit
30 . . . Data Storage Section
31 . . . Electropherogram Creator
32 . . . Gel Image Creator
33 . . . Display Processor
34 . . . Smear Range Specification Processor
35 . . . Smear Analysis Processor
4 . . . Operation Unit
5 . . . Display Unit
100 . . . Smear Analysis Window
101 . . . Sample Display Area
102 . . . Gel Image Display Area
103 . . . Electropherogram Display Area
104 . . . Analysis Result Display Area
105 . . . Size Input Dialog Box
300A, 300B . . . Electropherogram
310, 320 . . . Smear Range
311, 321 . . . Beginning Point Indication Line
312, 322 . . . Ending Point Indication Line
313, 323 . . . Range Indication Tag
400 . . . Analysis Result Table
410 . . . Beginning Size Display Meld
420 . . . Ending Size Display Field
430 . . . Analysis Result Display Fields
500 . . . Size Specification Data Grid
510 . . . Beginning Size Input Field
520 . . . Ending Size Input Field

The invention claimed is:

1. An electrophoretic analysis data processing device for processing data acquired by an electrophoretic analysis, comprising:
 a display processor configured to create an electropherogram based on the acquired data and display the electropherogram on a screen of a display section;
 an analysis range specifier configured to receive, on the electropherogram displayed on the display section, a specification, by a user, of a smear range to be extracted as an analysis target, and display a background area corresponding to the specified smear range on the electropherogram, in a visual mode that makes the background area distinguishable from other background areas; and
 an analysis processor configured to perform a predetermined smear analysis using data included in the specified smear area,
 wherein the analysis range specifier is configured to display, on the same screen as the electropherogram, an input area which allows numerical input of each of a beginning position and an ending position of the smear range to be analyzed, and to interlock an operation for an instruction concerning the smear range on the electropherogram and an operation for the numerical input in the input area with each other.

2. The electrophoretic analysis data processing device according to claim 1, wherein:
the display processor is configured to create and display an electropherogram in which one or more electrophoresis waveforms are arranged so that at least horizontal axes of the electrophoresis waveforms are aligned with each other; and
the analysis range specifier is configured to receive the specification of the smear range on the electropherogram in which the one or more electrophoresis waveforms are displayed.

3. The electrophoretic analysis data processing device according to claim 1, wherein the analysis range specifier is configured to change a position and a width of the smear range on the electropherogram according to a drag operation performed to move two end portions of the smear range individually.

4. The electrophoretic analysis data processing device according to claim 1, wherein the analysis range specifier is configured to change a position of the smear range on the electropherogram while maintaining a width of the smear range, according to a drag operation performed to move a tag assigned to the smear range.

5. The electrophoretic analysis data processing device according to claim 1, wherein the analysis processor is configured to perform the smear analysis every time the smear range specified by the analysis range specifier is modified, and the display processor is configured to display, on the same screen as the electropherogram, a smear analysis result obtained by the analysis processor.

6. A non-transitory record medium recording an electrophoretic analysis data processing program for processing data acquired by an electrophoretic analysis, wherein the program is configured to make a computer perform:
a display process step for creating an electropherogram based on the acquired data and displaying the electropherogram on a screen of a display section;
an analysis range specification step for receiving, on the electropherogram displayed on the display section, a specification, by a user, of a smear range to be extracted as an analysis target, and displaying a background area corresponding to the specified smear range on the electropherogram, in a visual mode that makes the background area distinguishable from other background areas; and
an analysis process step for performing a predetermined smear analysis using data included in the specified smear area,
wherein the analysis range specification step includes displaying, on the same screen as the electropherogram, an input area which allows numerical input of each of a beginning position and an ending position of the smear range to be analyzed, and interlocking an operation for an instruction concerning the smear range on the electropherogram and an operation for the numerical input in the input area with each other.

7. The non-transitory record medium recording an electrophoretic analysis data processing program according to claim 6, wherein:
the display process step includes creating and displaying an electropherogram in which one or more electrophoresis waveforms are arranged so that at least horizontal axes of the electrophoresis waveforms are aligned with each other; and
the analysis range specification step includes receiving the specification of the smear range on the electropherogram in which the one or more electrophoresis waveforms are displayed.

8. The non-transitory record medium recording an electrophoretic analysis data processing program according to claim 6, wherein the analysis range specification step includes changing a position and a width of the smear range on the electropherogram according to a drag operation performed to move two end portions of the smear range individually.

9. The non-transitory record medium recording an electrophoretic analysis data processing program according to claim 6, wherein the analysis range specification step includes changing a position of the smear range on the electropherogram while maintaining a width of the smear range, according to a drag operation performed to move a tag assigned to the smear range.

10. The non-transitory record medium recording an electrophoretic analysis data processing program according to claim 6, wherein the analysis process step includes performing the smear analysis every time the smear range specified in the analysis range specification step is modified, and the display process step includes displaying, on the same screen as the electropherogram, a smear analysis result obtained in the analysis process step.

* * * * *